United States Patent [19]

Kelly

[11] Patent Number: 4,558,862
[45] Date of Patent: Dec. 17, 1985

[54] GOLF PIN SOCK

[76] Inventor: Jason S. Kelly, 3430 Laketree Dr., Fallbrook, Calif. 92028

[21] Appl. No.: 595,623

[22] Filed: Apr. 2, 1984

[51] Int. Cl.[4] .......................... A63B 57/00; G09F 17/00
[52] U.S. Cl. .................................... 273/34 R; 73/188; 73/189; 116/173; 116/273
[58] Field of Search ............. 273/34 R; 116/173, 174, 116/175, 273, 264; 73/188, 189

[56] References Cited

U.S. PATENT DOCUMENTS

| | | | |
|---|---|---|---|
| 1,579,034 | 3/1926 | Roberts | 116/173 X |
| 2,467,374 | 4/1949 | Findlater | 73/188 |
| 3,526,200 | 9/1970 | Doyle | 116/173 X |

Primary Examiner—George J. Marlo
Attorney, Agent, or Firm—Hubbard, Stetina & Brunda

[57] ABSTRACT

An improved golf pin flag device for providing accurate wind velocity information is disclosed, including a golf pin and a flexible open-ended frusto-conical shaped flag member which, when encountering incident wind, enlarges and becomes extended in proportion to wind speed and self-orients parallel to the wind flow to indicate wind direction. A pair of elongated resilient members define the periphery of the larger opening of the frusto-conical member. The opposite ends of the elongated members are pivotably mounted to rotatable bearings on the golf pin. As the elongated members pivot away from each other, they enlarge the opening and the lowermost bearing slides upward on the golf pin.

8 Claims, 4 Drawing Figures

U.S. Patent  Dec. 17, 1985  4,558,862
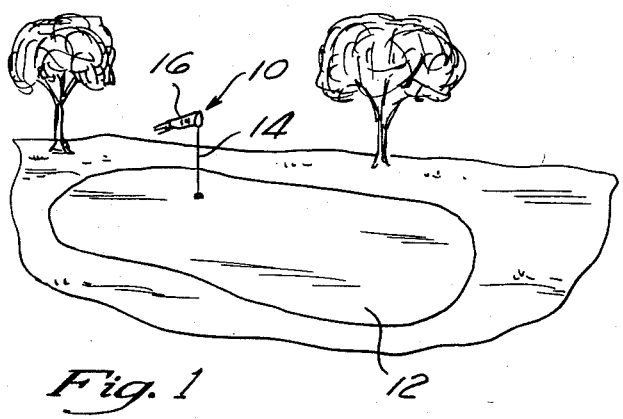
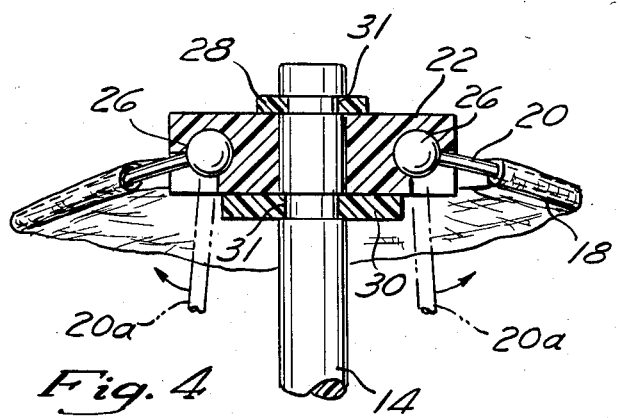
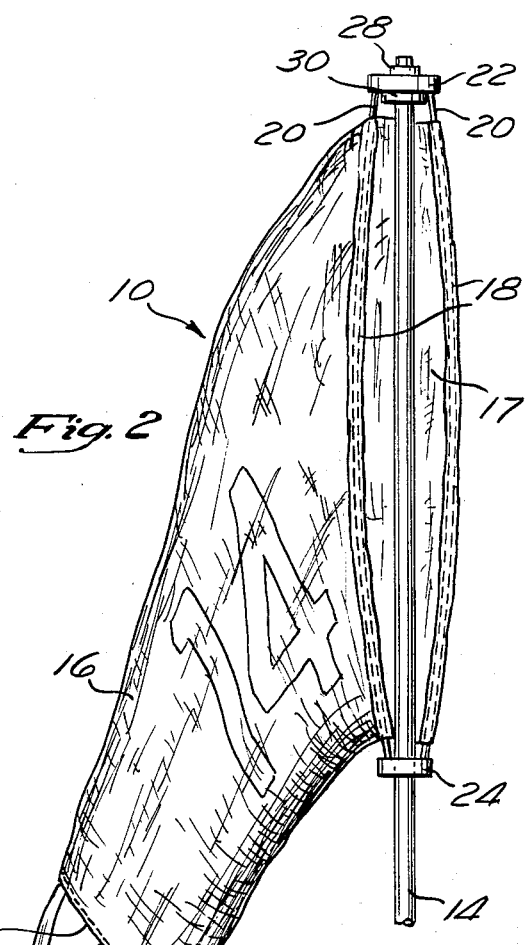
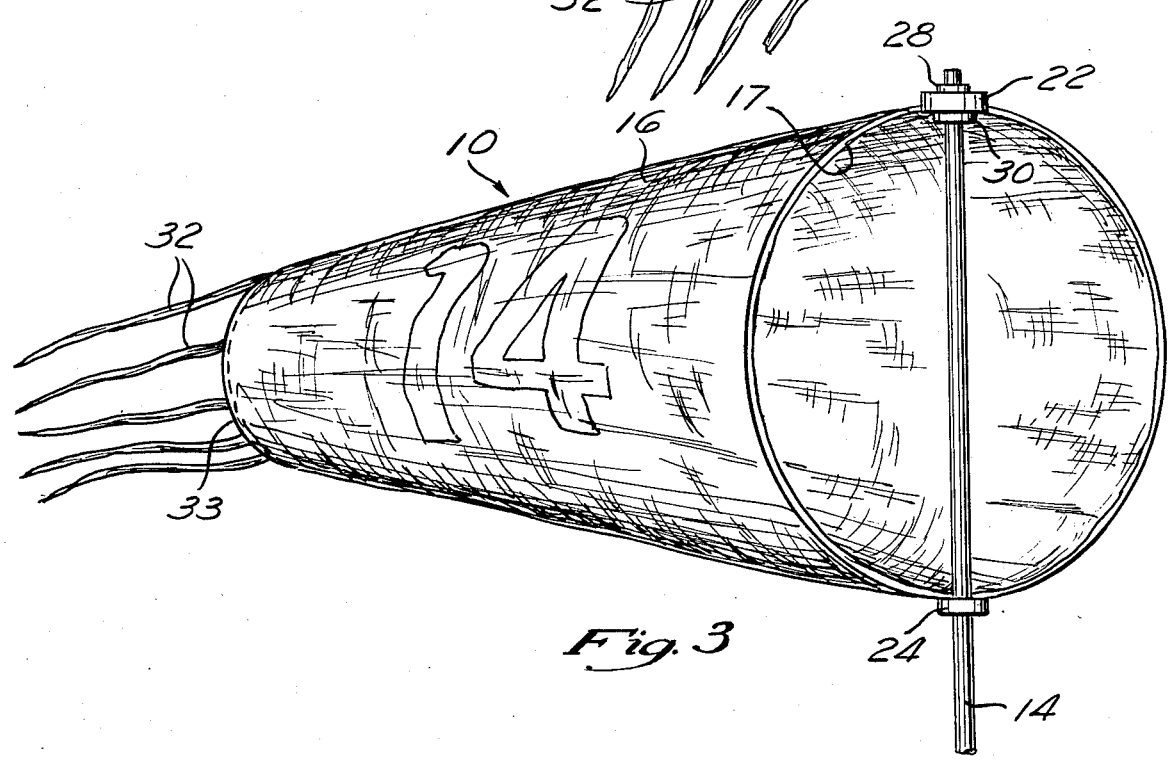

GOLF PIN SOCK

BACKGROUND OF THE INVENTION

The present invention relates generally to apparatus for the sport of golf pin sock, and more particularly, to an improved golf pin flag which provides generally accurate wind direction and speed information by visual observation of a user.

The use of flag pin on golf courses to mark the location of the cup on the green and to identify the number of the hole is common. Typically, the flag pin is composed of a fiberglass or metal elongate pin portion and a flag portion upon which the hole number is displayed. The flag portion is generally composed of a light weight flexible material, typically triangularly shaped, such that the flag may be additionally used to provide a rough indication of wind direction and speed, i.e. information that is extremely important to a golfer in his approach to a green.

As is well known, such prior art pin flags typically and characteristically undergo a random "flapping" or "waving" motion in the presence of wind. Due to this characteristic random flapping motion inherent in the prior art flags, accurate determination of wind direction has proven difficult and often unreliable. Further, because of this nature of the prior art flag, determination of variations in wind speed conditions has proven generally infeasible resulting in only crude determinations of actual wind velocity, which may be of questionable value to a golfer.

Thus, there exists a substantial need for an inexpensive flag pin that will provide more reliable information to a golfer concerning wind direction and wind speed.

SUMMARY OF THE INVENTION

The improved pin flag of the present invention specifically fills this void in the prior art by providing a golf pin flag construction which includes a generally wind sock configuration flag portion adapted to provide more reliable information concerning wind speed and wind direction.

More particularly, the present invention comprises an improved golf pin flag device wherein the flag portion is formed as a flexible generally tubular member having an open-ended frusto-conical shaped configuration. The large end of the flag portion includes a pair of flexible elongate members permanently attached to the tubular member about the periphery of the opening. The elongate members are formed having a slightly concave configuration in their relaxed position to continuously hold the larger end of the flag portion in a narrow oval or slit-like open configuration. Preferably, the uppermost bearing is permanently affixed adjacent the top of the golf pin while the lowermost bearing is movably mounted thereto to freely move vertically, i.e. axially reciprocate along the length of the golf pin.

The novel design configuration of the invention is such that in the absence of any wind, the tubular portion assumes a generally limp, non-descriptive shape, with the elongate members holding the large end of the flag slightly open in a narrow oval shape. Upon encountering the presence of wind, the tubular flag portion immediately rotates upon its pair of bearings about the golf pin to naturally self-orient in a parallel direction to the wind, with the larger opening of the flag portion facing into the wind. Streamers are preferably affixed about the periphery of the smaller opening as an additional indication of wind direction. As the wind speed progresses the tubular portion enlarges due to wind resistance forces from its initial limp shape to a generally tubular frusto-conical shape configuration. The concomitant expansion of the large opening from its initial slit or oval shape to a more circular shape is directly related to and dependent upon the speed of the wind and is facilitated by axial movement of the lowermost bearing upon the golf pin.

Unlike the conventional prior art flags which are relatively insensitive in providing accurate information as to wind velocities at both low velocities and high velocities and therefore adds little to a golfer's own observation concerning the wind conditions, the present invention provides more reliable and more accurate information on wind speed and direction by progressing from a limp configuration to a full and extended configuration in an amount directly proportional to wind speed thereby providing a continuous range of configurations related to wind speed. In addition, the design of the tubular flag member permits a more stable alignment of the invention in a parallel orientation to the wind thereby relaying reliable wind direction information to the golfer. Furthermore, the tubular member of the present invention can be constructed of lightweight and durable nylon, and the openings advantageously sized to accommodate the range of wind speeds in a particular location, for example, a smaller diameter of the small opening would result in less speed necessary to cause full extension of the tubular member.

DESCRIPTION OF THE DRAWINGS

These as well as other features of the present invention will become apparent upon reference to the drawings, wherein:

FIG. 1 is a perspective view of the golf pin flag of the present invention shown positioned in a cup on a typical golf green;

FIG. 2 is a perspective view of the present invention illustrating the general configuration of the golf pin flag in the absence of wind;

FIG. 3 is a perspective view of the present invention illustrating the full and extended configuration of the golf pin flag in the presence of a high speed wind; and FIG. 4 is a partial cross-sectional view of the ball and socket assembly illustrating the manner in which the elongate members rotate in response to increasing wind speeds.

DETAILED DESCRIPTION OF THE PREFERRED EMBODIMENT

Referring to FIG. 1, there is shown a golf pin flag 10 of the present invention in use on a typical golf course green 12 composed generally of a conventional fiberglass or metal shaft or golf pin 14 and a novel tubular member 16.

As shown in FIGS. 2 and 3, the tubular flag member 16 is fabricated of a flexible material having a frusto-conical shaped configuration open at both ends. In the preferred embodiment, the tubular member 16 is constructed of nylon, although other fabric materials are within the contemplation of the invention. The tubular member 16 at the larger open end 17 is formed with a overlapped hem 18 or similar structure about the majority of its periphery sized to receive two elongate members 20. The elongate members 20 are formed having a slightly concave configuration in their relaxed position, being fabricated of a resilient plastic material in the preferred embodiment, although other resilient materials may be used, and having a combined dimension substantially the same as the circumference of the larger open end 17 of the tubular member 16. Opposite ends of the elongate members 20 extend a short distance outside the hem 18 of the tubular member 16.

An uppermost bearing 22 and a lowermost bearing 24 are sized to be rotatably mounted upon the golf pin 14 and are formed having a doughnut-shaped configuration with an axial aperture sized slightly larger than the diameter of the golf pin 14. As can be seen in FIG. 4, the bearings 22 and 24 include a pair of slotted ball and socket assemblies 26 into which the ends of the elongate members 20 may be inserted and tightly received. By these slotted ball and socket assemblies 26, the elongate members 18 are free to rotate in a vertical plane within the bearings 22 and 24 (as indicated by the arrow in FIG. 4) but are restrained from rotation within the bearing in a plane perpendicular to the axis of the golf pin 14.

The uppermost bearing 22 once positioned on the golf pin 14 is axially affixed adjacent the top of the golf pin 14 by an upper retaining ring 28 and a lower retaining ring 30. The retaining rings 28 and 30 in the preferred embodiment are formed in a spring clip configuration with an axial aperture (not shown) and a single radial opening sized slightly smaller than corresponding annular recesses 31 formed on the golf pin 14. The diameter of the axial apertures formed in the retaining rings 28 and 30 is equal to or slightly greater than the diameter of the annular recesses 31 of the golf pin 14. Once the uppermost bearing 22 is positioned between the annular recesses 31, the radial openings in the retaining rings 28 and 30 are aligned with and forceably inserted over the annular recessions 31 of the golf pin 14. As such, the retaining rings 28 and 30 are axially oriented with the golf pin 14 and are tightly received within the annular recession 31 of the golf pin 14, thereby preventing vertical (i.e. axial) movement of the uppermost bearing 22 along the length of the pin 14, while permitting free rotational movement about the golf pin 14. In the preferred embodiment, the retaining ring 30 is sized slightly larger than the retaining ring 28 to additionally provide a registry surface upon which the uppermost bearing 22 may rotate. It will be recognized that a variety of metals are within the contemplation of the invention that will restrict the uppermost bearing 22 from axial movement along the golf pin 14, while permitting free rotational movement about the golf pin 14.

The lowermost bearing 24 is formed with an axial aperture (not shown) sized to slidably receive the golf pin 14, thereby allowing both axial and rotational movement of the lowermost bearing along the length of the golf pin 14.

With the structure defined, the basic operation of the present invention to provide more reliable and accurate wind direction and speed information to a golfer may be described. As best shown in FIG. 2, the tubular member 16 and golf pin 14 are assembled by positioning the bearings 22 and 24 on the golf pin 14, then securing the uppermost bearing 22 in place by forcing the retaining rings 28 and 30 in their respective annular recessions 31 on the golf pin 14. In the absence of wind, as depicted in FIG. 2, the tubular member 16 assumes a generally limp configuration, with the elongate members 20 continuously holding the larger open end 17 of the tubular member 16 slightly open in a narrow oval shape, such that the slightly wind may be captured, and with the lowermost bearing 24 positioned at its lowest vertical point on the golf pin 14.

As wind speed progressively increases to a high wind speed as depicted in FIG. 3, the captured incident wind speed inside the tubular member 16 increases the wind force within the tubular member 16, because of the increased resistance of the smaller open end 25 to wind flow, thereby causing the tubular member 16 to enlarge from its initial limp shape to a generally frusto-conical tubular shape additionally extending outwardly in a perpendicular direction to the golf pin 14.

Concomitantly, the wind force within the tubular member 16 overcomes the internal resiliency of the elongate members 20 causing the elongate members 20 to deform and move toward a more semi-circular configuration. This movement is facilitated by axial movement of the lowermost bearing 24 along the golf pin 14. As best shown in FIG. 4, the ball and socket assemblies 26 permit the ends of the elongate members 20 to move as illustrated by the arrows from a near-vertical position in the absence of wind, as shown by the phantom elongate members 20a to a near-horizontal position in the presence of increasing wind speeds as the elongate members 20 assume a more semi-circular configuration. The slotted ball and socket assemblies 26 are configured to restrict the movement of the elongate members 20 to a common plane parallel to the axis of the golf pin 14. The increasing speed of the wind thereby progressively deforms the elongate members 20 causing expansion of the larger open end 17 from an oval shape toward a more circularly-shaped opening as the lowermost bearing 24 is axially moved along the golf pin 14. As such, the present invention undergoes progressive configurational changes from a limp shape having a narrow slit-like larger open end 17 to a full and extended configuration in an amount dependent on and directly proportional to the speed of the wind.

Thus, wind speed information can be reliably observed by noting the relative configuration of the present invention. Since the tubular member 16 assumes a distinct shape relative to a particular wind speed, the present invention is sensitive to both low and high wind speeds. Further, because of the construction and configuration of the tubular member 16, the diameter of the openings 17 and 31, particularly the smaller open end 31, may be varied to increase or decrease the magnitude of the wind speed necessary to cause full distention of the tubular member 16, thereby modifying the range of wind speeds to which the present invention would be responsive.

In addition, the present invention serves to provide reliable information on the direction of the incident wind. Because of the tubular member 16, incident wind strikes both the internal and external surfaces of the tubular member 16 causing self-orientation in a direction generally parallel to the direction of wind flow as the tubular member 16 rotates upon the bearings 22 and 24 about the golf pin 14, with the larger open end 17 facing the incident wind. The three-dimensional structure of the tubular member 16 eliminates the random "flapping" motion characteristic of a two-dimensional flag-like structure, becoming more stable with increasing wind speeds, thereby providing a more accurate and reliable source of information relating to wind direction. Streamers 32, formed in a triangular configuration and fabricated of a nylon material in the preferred embodiment, are affixed to the periphery of the smaller open end 31 to assist in determining the wind direction.

In summary, the present invention represents a significant improvement in golf flags by providing a device designed to convey reliable information concerning wind speed and wind direction. The present invention progressively changes its shape and extension in relation to the wind speed and stably orients itself parallel to the flow of wind to provide accurate information on wind direction.

What is claimed is:

1. An improved golf pin flag device comprising:
    a golf pin comprising a staff for marking the location of a hole in a golf green;
    a frusto-conical shaped tubular member having a large open end and a small open end positioned upon said golf pin and adapted to be disposed to wind;
    means positioned adjacent said large end of said tubular member, said means comprising a pair of elongate members formed of a sufficiently resilient material to maintain said large end of said tubular member in a first open position and selectively permit said large end of said tubular member to extend into a second open position, larger than said first open position and porportional to the increased wind speed periodically impinging upon said tubular member; and
    a pair of bearings rotatably mounted to said golf pin, each adapted to capture opposite ends of said pair of elongate members to attach said tubular member to said golf pin, one of said pair of bearings further being mounted to said golf pin to permit axial reciprocation of said one bearing during extention of said large end of said tubular member from said first to said second open position.

2. The device of claim 1 wherein said pair of bearings each include a ball and socket joint to provide for pivotal movement of said pair of elongate members in a generally common plane coincident with the axis of said golf pin.

3. The device of claim 1 wherein said pair of elongate members extend about the periphery of said large end of said tubular member.

4. The device of claim 3 wherein said elongate members are formed having a convex configuration.

5. The device of claim 4 wherein said elongate members are formed of a sufficiently flexible resilient material to resiliently deform between said first and said second open positions.

6. The device of claim 5 wherein said tubular member is comprised of a fabric material.

7. The device of claim 6 wherein said fabric material is nylon.

8. The device of claim 7 wherein said pair of elongate members are formed of a plastic material.

* * * * *